(12) United States Patent
Cheng et al.

(10) Patent No.: US 8,793,341 B2
(45) Date of Patent: Jul. 29, 2014

(54) WEB PAGE CONTENT TRANSLATOR

(75) Inventors: Yin Cheng, Vienna, VA (US); Wilfredo Padin, Ashburn, VA (US); Rongli Jiang, Herndon, VA (US); Andrew Fedorchek, Centreville, VA (US)

(73) Assignee: CRFD Research, Inc., Alexandria, VA (US)

( * ) Notice: Subject to any disclaimer, the term of this patent is extended or adjusted under 35 U.S.C. 154(b) by 198 days.

(21) Appl. No.: 12/458,154

(22) Filed: Jul. 1, 2009

(65) Prior Publication Data

US 2010/0017502 A1  Jan. 21, 2010

Related U.S. Application Data

(62) Division of application No. 09/707,770, filed on Nov. 8, 2000, now Pat. No. 7,574,486.

(60) Provisional application No. 60/245,680, filed on Nov. 6, 2000.

(51) Int. Cl.

| | | |
|---|---|---|
| *G06F 15/16* | (2006.01) |
| *G06F 15/167* | (2006.01) |
| *G06F 15/173* | (2006.01) |
| *G06F 17/00* | (2006.01) |
| *G06F 3/00* | (2006.01) |
| *H04N 5/225* | (2006.01) |
| *H04N 5/228* | (2006.01) |
| *H04N 9/73* | (2006.01) |
| *H04N 5/235* | (2006.01) |
| *H04N 9/68* | (2006.01) |
| *G06K 9/40* | (2006.01) |
| *G06K 9/32* | (2006.01) |
| *H04L 29/08* | (2006.01) |
| *G06Q 10/10* | (2012.01) |
| *H04L 29/06* | (2006.01) |
| *G06F 17/30* | (2006.01) |
| *G06F 17/24* | (2006.01) |
| *G06F 17/22* | (2006.01) |

(52) U.S. Cl.
CPC ........ *H04L 29/08072* (2013.01); *G06Q 10/107* (2013.01); *H04L 29/06* (2013.01); *H04L 29/0854* (2013.01); *G06F 17/30017* (2013.01); *G06F 17/24* (2013.01); *G06F 17/2247* (2013.01); *G06Q 10/10* (2013.01)
USPC .......... 709/219; 709/200; 709/203; 709/206; 709/207; 709/217; 709/218; 709/227; 709/228; 709/246; 709/248; 715/202; 715/205; 715/207; 715/208; 715/229; 715/234; 715/744

(58) Field of Classification Search
CPC .............. H04L 29/08072; H04L 29/06; H04L 29/0854; G06Q 10/107; G06F 17/30017; G06F 17/24; G06F 17/2247
See application file for complete search history.

(56) References Cited

U.S. PATENT DOCUMENTS

| | | | | |
|---|---|---|---|---|
| 5,185,857 | A | * | 2/1993 | Rozmanith et al. ........... 715/207 |
| 5,890,014 | A | * | 3/1999 | Long ................................ 710/8 |
| 6,049,821 | A | * | 4/2000 | Theriault et al. .............. 709/203 |
| 6,247,048 | B1 | | 6/2001 | Greer |
| 6,272,493 | B1 | * | 8/2001 | Pasquali ........................ 709/219 |
| 6,272,560 | B1 | * | 8/2001 | Kenton et al. ..................... 710/8 |
| 6,287,198 | B1 | * | 9/2001 | McCauley ....................... 463/37 |
| 6,311,180 | B1 | * | 10/2001 | Fogarty ......................... 707/749 |
| 6,412,008 | B1 | * | 6/2002 | Fields et al. ................... 709/228 |
| 6,421,717 | B1 | * | 7/2002 | Kloba et al. ................... 709/219 |
| 6,434,563 | B1 | * | 8/2002 | Pasquali et al. ............... 707/770 |
| 6,434,626 | B1 | * | 8/2002 | Prakash et al. ................ 709/238 |
| 6,487,588 | B1 | * | 11/2002 | Phillips et al. ................ 709/218 |
| 6,493,758 | B1 | * | 12/2002 | McLain ......................... 709/227 |
| 6,494,762 | B1 | * | 12/2002 | Bushmitch et al. ........... 446/268 |
| 6,507,867 | B1 | | 1/2003 | Holland |
| 6,507,872 | B1 | * | 1/2003 | Geshwind ...................... 709/236 |
| 6,539,384 | B1 | * | 3/2003 | Zellner et al. ................... 455/95 |
| 6,564,263 | B1 | * | 5/2003 | Bergman et al. .............. 709/231 |
| 6,584,567 | B1 | | 6/2003 | Bellwood |
| 6,587,871 | B1 | | 7/2003 | Schrader |
| 6,594,349 | B2 | | 7/2003 | Fortman |
| 6,606,663 | B1 | | 8/2003 | Liao |
| 6,610,105 | B1 | * | 8/2003 | Martin et al. .................. 715/202 |
| 6,615,212 | B1 | | 9/2003 | Dutta |
| 6,643,684 | B1 | * | 11/2003 | Malkin et al. ................. 709/206 |

| | | | |
|---|---|---|---|
| 6,654,786 B1 | 11/2003 | Fox | |
| 6,718,015 B1* | 4/2004 | Berstis | 379/88.17 |
| 6,738,614 B1 | 5/2004 | Blankenship | |
| 6,742,038 B2 | 5/2004 | Britt, Jr. | |
| 6,772,180 B1* | 8/2004 | Li et al. | 715/229 |
| 6,775,805 B1* | 8/2004 | Watanabe et al. | 715/202 |
| 6,779,178 B1* | 8/2004 | Lloyd et al. | 717/174 |
| 6,826,597 B1* | 11/2004 | Lonnroth et al. | 709/207 |
| 6,834,306 B1* | 12/2004 | Tsimelzon | 709/228 |
| 6,857,102 B1* | 2/2005 | Bickmore et al. | 715/205 |
| 6,920,488 B1* | 7/2005 | Le Pennec et al. | 709/219 |
| 6,925,595 B1* | 8/2005 | Whitledge et al. | 715/234 |
| 6,934,046 B1* | 8/2005 | Nishikawa et al. | 358/1.15 |
| 6,938,073 B1* | 8/2005 | Mendhekar et al. | 709/217 |
| 6,993,476 B1* | 1/2006 | Dutta et al. | 704/9 |
| 7,058,699 B1* | 6/2006 | Chiou et al. | 709/219 |
| 7,134,073 B1 | 11/2006 | Fiedorowicz | |
| 7,239,629 B1* | 7/2007 | Olshansky et al. | 370/353 |
| 7,249,196 B1* | 7/2007 | Peiffer et al. | 709/246 |
| 7,349,955 B1* | 3/2008 | Korb et al. | 709/219 |
| 7,415,537 B1* | 8/2008 | Maes | 709/246 |
| 7,475,346 B1* | 1/2009 | Bullock et al. | 709/203 |
| 7,502,922 B1* | 3/2009 | Amin et al. | 713/151 |
| 7,509,397 B1* | 3/2009 | Totty et al. | 709/219 |
| 7,904,799 B1* | 3/2011 | Underwood et al. | 715/208 |
| 2001/0003823 A1* | 6/2001 | Mighdoll et al. | 709/200 |
| 2002/0049833 A1* | 4/2002 | Kikinis | 709/219 |
| 2002/0143821 A1 | 10/2002 | Jakubowski | |
| 2003/0120686 A1 | 6/2003 | Kim | |
| 2004/0215829 A1 | 10/2004 | Hubbard | |
| 2007/0067329 A1* | 3/2007 | Kamvar et al. | 707/102 |
| 2009/0125809 A1 | 5/2009 | Trapani | |
| 2010/0228880 A1 | 9/2010 | Hunt | |

OTHER PUBLICATIONS

*CRFD Research Inc.* v. *ATT&T Inc. et al.*, Complaint for Patent Infringement, United States District Court for the District of Delaware, Docket No. 1-14-cv-00059, Jan. 17, 2014.
*CRFD Research Inc.* v. *Cablevision Systems Corporation et al.*, Complaint for Patent Infringement, United States District Court for the District of Delaware, Docket No. 1-14-cv-00060, Jan. 17, 2014.
*CRFD Research Inc.* v. *Comcast Corporation et al.*, Complaint for Patent Infringement, United States District Court for the District of Delaware, Docket No. 1-14-cv-00061, Jan. 17, 2014.
*CRFD Research Inc.* v. *Dish Network Corporation et al.*, Complaint for Patent Infringement, United States District Court for the District of Delaware, Docket No. 1-14-cv-00064, Jan. 17, 2014.
*CRFD Research Inc.* v. *Cox Communications Inc.*, Complaint for Patent Infringement, United States District Court for the District of Delaware, Docket No. 1-14-cv-00062, Jan. 17, 2014.
*CRFD Research Inc.* v. *DirectTV et al.*, Complaint for Patent Infringement, United States District Court for the District of Delaware, Docket No. 1-14-cv-00063, Jan. 17, 2014.
*CRFD Research Inc.* v. *Time Warner Cable Inc. et al*, Complaint for Patent Infringement, United States District Court for the District of Delaware, Docket No. 1-14-cv-00067, Jan. 17, 2014.

\* cited by examiner

*Primary Examiner* — Ario Etienne
*Assistant Examiner* — Ho Shiu
(74) *Attorney, Agent, or Firm* — William H. Bollman

(57) ABSTRACT

A system, method, and computer readable medium for reformatting web content into a format readable on one or more mobile devices is provided. A user generates a user request for a web page from a mobile device to a proxy server. The proxy server forwards the user request to an origin web server, which returns the requested web page to the proxy server. A conversion engine within the proxy server extracts the desired content from the web page, and reformats the content in accordance with one or more predefined transform methods associated with the one or more mobile devices before transmitting the transformed web page with the desired content to the one or more mobile devices. Secure or unsecure connection provided via a decorated uniform resource locator can be used to connect a mobile device, the proxy server, and an origin web server.

8 Claims, 11 Drawing Sheets

DOCUMENT OBJECT MODEL (DOM)

WEB PAGE CONTENT TRANSLATOR

RELATED APPLICATION

This application is a divisional application of U.S. patent application Ser. No. 09/707,770, entitled "Web Page Content Translator," filed Nov. 8, 2000, which in turn claims priority from U.S. Provisional Application No. 60/245,680, filed Nov. 6, 2000, entitled "Web Page Content Translator", the entirety of both of which are explicitly incorporated herein by reference.

BACKGROUND OF THE INVENTION

1. Field of the Invention

The present invention relates generally to dynamically extracting and reformatting existing web page content and, more particularly, to dynamically extracting a portion of content from a web page and reformatting the extracted content for viewing on a mobile device.

2. Background Description

Organizations of all sizes are reliant on the Internet to conduct business. Because of the explosion of mobile enterprise solutions, users of wireless devices now demand that businesses deliver web content for viewing on desktop, or mobile/portable (e.g., handheld) devices. Whether organizations are creating new web applications, or extending existing infrastructure, the new Internet powered world demands that users have access to the applications and information they need when they need it to speed business, remain flexible and competitive, and drive stronger customer relationships.

Before now, the solutions available for delivering web content to mobile devices generally required organizations to develop and maintain multiple sets of content, one for viewing in a desktop environment, and others for viewing on each individual type of mobile device. Further, secure connections between mobile devices and web servers via a proxy server that reformats original web page content were generally unavailable via a decorated uniform resource locator (URL) connection. A need exists, therefore, for a standards based, create once, deliver everywhere approach to web enabling mobile devices.

SUMMARY OF THE INVENTION

It is a feature and advantage of the present invention to provide a system and method that dynamically extracts a portion of web content for viewing on mobile devices;

It is another feature and advantage of the present invention to provide a system and method that reformats extracted web content for viewing on mobile devices using transforms that, for example, add meta tag information to the header of a page, add a specific attribute and attribute value to a specific tag, ignore previously specified global conversions, and/or insert text from a specified file;

It is yet another feature and advantage of the present invention to manage and maintain a single set of web content that can be used in both desktop and mobile device environments;

It is still another feature and advantage of the present invention to eliminate the need to maintain multiple sets of web content, one for each device type, for delivery to a plurality of mobile devices.

It is another feature and advantage of the present invention to optionally provide a secure connection via a decorated URL between a mobile device and/or a client (e.g., a Wireless Access Protocol (WAP) gateway) which forwards a secure request from the mobile device, a proxy server that reformats original web page content, and a web page server.

It is another feature and advantage of the present invention to provide a secure connection between, for example, a proxy server that reformats an original web page and an origin web page server by setting up the proxy server in a mobile device browser (i.e., enabling the mobile device to communicate with the origin web page server via the proxy server).

To achieve these features and advantages, the present invention provides a system, method, and medium that extracts a portion of web page content and reformats the extracted content for delivery to one or more wireless devices. Embodiments of the present invention contemplate that web-based content can be created one time, whereafter at least a portion thereof is extracted, reformatted, and transmitted to, for example, one or more handheld device browsers (e.g., the Palm Web Clipping Browser from Palm, Inc., Santa Clara, Calif., Pocket Internet Explorer from Microsoft Corp, Redmond, Wash., and Wireless Access Protocol (WAP) on smart phones, etc.). This create-once, deliver-everywhere approach eliminates the need to build and maintain separate web pages for different devices and browsers, as well as the need to install proprietary browser software on the handheld device(s). In one embodiment contemplated by the present invention, a user generates a request, from a mobile device to a proxy server. The proxy server then forwards the user request to an origin web server (having a first file format), whereafter the requested web page is returned to the proxy server. The appropriate components (e.g., tags, etc.) of, for example, the HTML or Wireless Markup Language (WML) source code, are extracted from the web page. The extracted web page contents are then reformatted to place the extracted web page contents in a format the is viewable by one or more mobile devices. The reformatted web page is then transmitted from the proxy server to the requesting mobile device. The may be done for at least one of groups of devices, individual devices, web site-specific conversions, or for all web sites. The method of the present invention also provides a secure connection via a decorated URL between a mobile device and/or client (e.g., a WAP gateway) which forwards a secure request from the mobile device, a proxy server that reformats original web page content, and a web page server.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The Detailed Description will be best understood when read in reference to the accompanying figures wherein.

DETAILED DESCRIPTION OF A PREFERRED EMBODIMENT OF THE INVENTION

Figure 1:
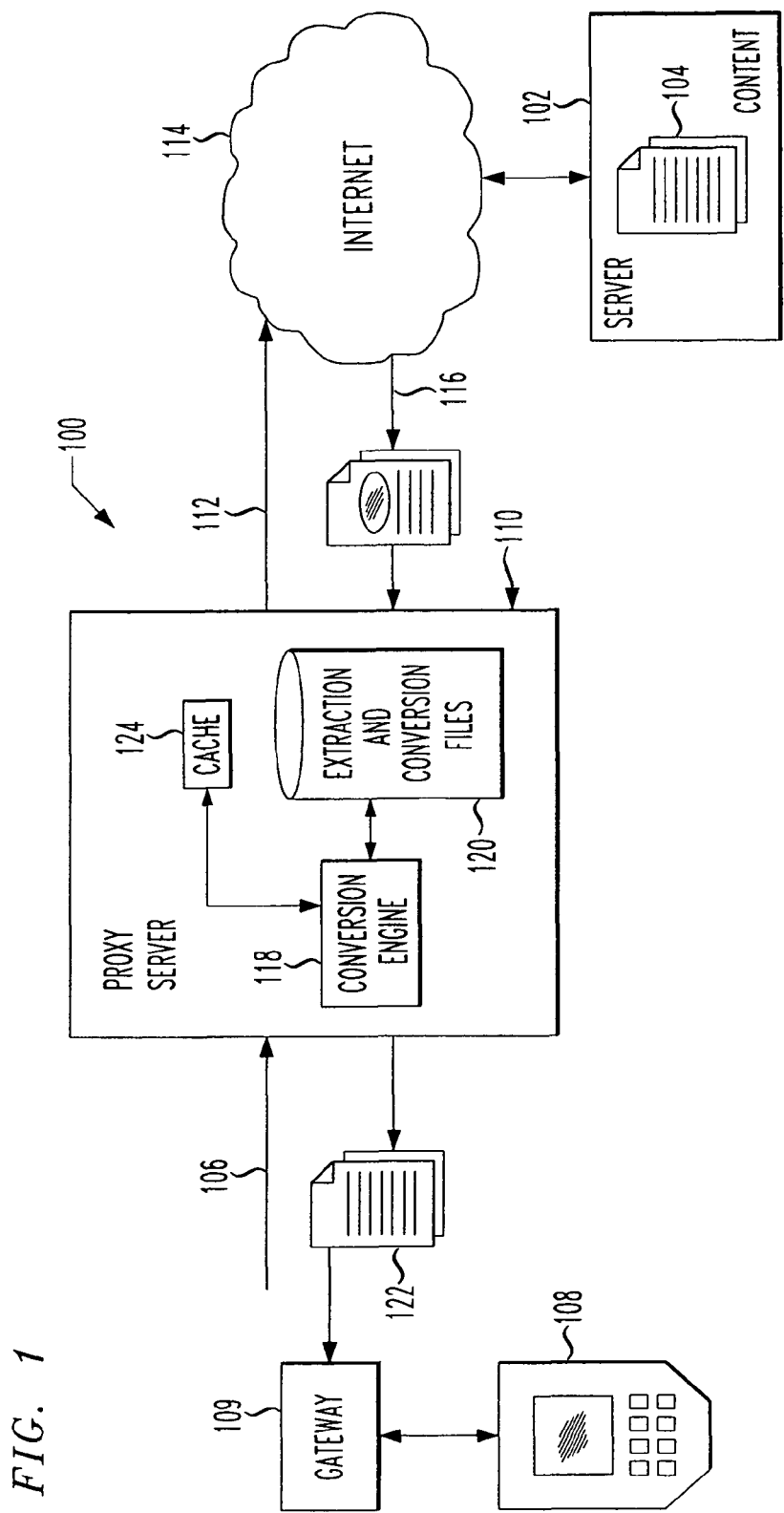
FIG. 1 is a representative simplified block diagram of a mobile device, a proxy server, and a content server which also illustrates an overview of the method according to the present invention.

FIG. 1 illustrates an architecture 100 as contemplated of the present invention (and environments thereof). Referring now to FIG. 1, it is envisioned that a proxy server 110 reformats/converts web content 104 on an origin web server 102 into a format 122 readable on any mobile device 108 (which can be any number of different mobile device types). Details of the architecture of the present invention, the order in which conversions are processed, and how mobile devices 108 are connected to proxy server 110 through the present invention are explained herein.

The proxy server 110 of the present invention "sits" between the clients (e.g., the mobile device(s) 108) and the origin web server(s) 102 that provide Web content 104. If necessary, a gateway 109 may optionally be provided that interfaces between, for example, the mobile device 108 and the proxy server 110. In this context, an origin web server 102 is a web server that contains the original web page 104. It is different from, for example, the proxy server 110 because the original web server 102 is maintained and updated by the individual(s) and/or organization(s) that hosts the web site for the web page 104. Unlike other proxy servers, however, the present invention obtains the code (e.g., HTML) of the user requested web page 104, and modifies it at the proxy server 110 (once obtained) in accordance with at least one novel method described herein. Embodiments contemplated by the present invention also envision reformatting and/or converting an entire web site or request specific Web content that is needed from the origin web server 102.

In general, embodiments of the present invention contemplate that architecture 100 comprises one or more servers 102 having web content (in the form of at least one web page 104), a proxy server 110, at least one mobile device 108, and at least one network 114. For simplicity, only one of each of H the mobile device 108, server 102, and network 114 are shown in FIG. 1, although in general the system 100 may comprise multiples of each. It is envisioned that each instance of web content 104 each have associated therewith a URL.

Upon a request 106 from a mobile device 108 for a given web page 104, typically made through a HyperText Transport Protocol (HTTP) from the resident mobile device, or Hyper-Text Transport Protocol Secure (HTTPS) request from the resident mobile device 108 browser, the process for providing a reformatted/converted and extracted web page 104 begins. It should be understood that the gateway 109 will receive such a HTTP or HTTPS request if a gateway 109 is used. Upon determining that the requested page 104 resides at the server 102, the proxy server 110 makes a request 112 for the page. As shown, the proxy server 110 and the server 102 are connected via a network 114 such as the Internet. It should be understood that the present invention can be used with networks other than the Internet where visual content is involved. Therefore, depending on the network(s) being utilized in conjunction with the present invention, it should be apparent that the visual content from such network(s) may be other than "web" content. The server 102 responsively returns 116, via the network 114, the requested web page 104 to the proxy server 110. The web page 104 is typically an HTML file with references to any component .wav, .mov, and/or Joint Photographic Experts Group (JPEG) files, which together comprise the web page 104. It should also be understood that other file formats (e.g., .gif (graphics interchange format)) and web page components (e.g., Java applets) can also be accessed and returned to the proxy server 110.

The conversion engine 118, preferably residing within the proxy server 110, retrieves and/or accesses the stored web page 104, and accesses a predefined extraction and conversion file associated with the mobile device 108 and/or web page 104, preferably via the extraction and conversion file database 120. Extraction and conversion files may, for example, contain the following information:

Variables: These are variables that are defined when a site-mining expression is created. A variable is essentially a place holder for the information to "go" after the conversion engine 118 extracts it from a web page 104 preferably residing on server 102. A site-mining expression is a command that tells the conversion engine 118 where to locate the desired web content (in, for example, the HTML code) in the web page 104. One embodiment of the present invention uses software such as Spyglass Prism from OpenTV, Inc., Mountain View, Calif. to extract data from a designated web page 104. Methods that can be used in site-mining expressions in accordance with the Spyglass Prism product are contained in, for example, the Exemplary Site Mining Methods section and other sections contained herein.

System variables: Embodiments of the present invention contemplate that there are preferably at least three system variables that can be added to extraction and conversion files, including:

a) &&Host;

Identifies the name of the server 102 that the proxy server 110 is connecting to for a particular request 106.

b) &&User-Agent (UA);

Identifies the type of mobile device 108 and the web browser of the mobile device 108.

c) &&URLLink;

Identifies the address of the server 102 that the proxy server 110 is connecting to.

It should be understood that the variables and delimiters are illustrative only and that different variables and/or delimiters can be used to achieve the same functionality Transforms: Transforms are conversion tags that are used to re-format the content extracted from a web page 104. These special tags (also called sw-transforms) provide the power to display the Web content in the desired format 122 for a mobile device(s) 108. The present invention provides transforms that, for example: add meta tag information to the header of a page, add a specific attribute and attribute value to a specific tag, ignore previously specified global conversions, insert text from a specified file, remove a specific attribute from all tags, remove a specific attribute from a specific tag, remove the comments tag from a web site or specific web content, remove a specific tag from a web site or web content, remove a specific tag and all the information that appears within the tag from a web site or web content, replace one tag with another, set a specific value of a specific attribute of a specific tag, stop processing of all subsequent reformatting commands, substitute one sequence of text for another sequence of text, and remove table formatting. The sw-transforms used to reformat the extracted web content are contained in the SW-Transforms section contained herein.

Mobile devices 108 generally come in a variety of different sizes and have a variety of different screen interfaces. As will be discussed in further detail herein, the present invention provides the ability to uniquely tailor web page 104 content for specific mobile devices 108. A particular organization may know that its users will always be retrieving web pages using, for example, Palm operating system devices (e.g., Palm III, X, VIIs, etc.). Formatting rules may be set up that apply to the group of Palm operating system devices generally, as well as, for example, the Palm VII in particular. To create a device profile, both the specific version of a mobile device 108 and its web browser (e.g., a Palm V with browser A, etc.) are needed. In one embodiment, device profiles are registered with the proxy server 110 by using HTTP request headers, as will be explained in detail herein.

It should also be understood that in addition to providing a device profile for an individual mobile device 108, device profiles can also be created for a group of mobile devices 108, as well as all mobile devices 108. In the latter case, suppose, for example, an organization's mobile device 108 users will often be visiting graphic-intensive web sites, and that the users will be viewing these sites on, say, smart phones (i.e., a cellular telephone that provides voice, limited Internet access, e-mail, pager and/or facsimile service, and typically has a small screen and little memory). A global extraction and conversion file can be created that, for example, instructs the conversion engine 118 to replace all graphics with text links. This conversion would affect all web content that is delivered to all mobile device 108 users. Users can therefore access web sites they need without the inconvenience of waiting online for graphics to download onto their mobile devices 108.

Thus, using an extraction and conversion file within the storage 120 corresponding to the particular mobile device(s) 108, the conversion engine 118 uses the expressions defined therein, and performs the designated operations upon, for example, the HTML code contained in the web page 104. The designated HTML content of the retrieved web page 104 is extracted, subsequently and/or converted, and transmitted as a reformatted web page 122 to the mobile device 108.

To improve performance (e.g., speed), web page 104 can optionally be cached in a local cache 124 on the proxy server 110. Caching enables web pages 104 to be processed faster, thereby reducing the time mobile device 108 users spend online. When the proxy server 110 receives a web page 104 over, say, the Internet 114, the conversion engine 118 can convert and store the web page 122 in a web page 122 specific cache. When a user of a mobile device 108 wants to access the web page 122, the conversion engine 118 retrieves it from the cache 124, which reduces online time.

It should also be understood that the proxy server 110 can also cache unconverted web page 104 content. Unconverted web page 104 content is content received from the server 102, which has not yet been converted and/or extracted by the conversion engine 118. Cache settings can therefore be configured to meet specific needs (e.g., when caching will begin, the length of time pages will be kept in cache, and the amount of disk space and memory that will be allocated to caching).

Security Features

The proxy server 110 according to the present invention envisions the use of various types of security to ensure that the transmission of information is secure (e.g., that unauthorized parties cannot intercept and/or access the information). An example envisioned by embodiments of the present invention provides the ability to support the secure socket layer (SSL) protocol developed by Netscape Corp. (now merged with America Online, Inc., Dulles, Va.). When this feature is utilized, users can make secure connections (from, for example, a mobile device 108 to the proxy server 108 and from the proxy server 108 to the origin web server 102 and back), as well as partially secure connections. In embodiments contemplated by the present invention, the proxy server will the proxy server will load an SSL library, which includes, for example, SSL 2.0 and SSL 3.X protocol specification modules.

If the SSL feature of the present invention is utilized, a digital certificate from a certificate authority (e.g., VeriSign) must be obtained. The digital certificate is sent to a client (e.g., a mobile device 108 or a gateway 109) to authenticate the proxy server 110, in order to establish a secure connection between the client and the proxy server 110).

Embodiments of the present invention contemplate that there are at least four types of SSL settings that can be configured for the proxy server 110, including, for example:

SSLON: This setting determines whether SSL is turned on and off. The default setting is on (as indicated by, for example, SSLON=1).

SSL port: This setting determines which secure port the server listens on.

SSL Certificate Settings: SSL certificate request settings are located in the proxy server .ini file. Changes to the default public certificate file name or the password for the certificate key (e.g., password), are made via the proxy server 110 .ini file.

SSLOutboundPort: This port is a listening port the proxy server 110 uses for outbound SSL requests.

It is envisioned that if the defaults are accepted for each of the above four SSL settings, the SSL settings in, for example, the proxy server 110 .ini file do not have to be configured.

Embodiments of the present invention contemplate that in the event that a particular mobile device 108 does not enable a proxy server 110 to be used, the present invention enables mobile devices to be redirected to proxy through the proxy server 110 by typing (or in some way, entering or implementing) the proxy server 110 address (location) and the URL of the desired web site 104 in, for example, an address field of the mobile device 108 browser. This type of address is commonly referred to as a "decorated URL". A decorated URL contains, for example, the proxy server 110 host name and port number, and the web address of the web site 104 that is to be accessed.

With the present invention, the above-identified URL decoration can be used to make an un-secure (http://) request or a secure (https://) request. Regardless of what type of connection is made, after an initial decorated URL is typed in, the proxy server retrieves the desired web page 104. For example, the proxy server automatically re-writes all of the other links within the site that are initially proxied to via the decorated URL. That is, if one or more links are embedded within a first web site, and a user clicks on one of the links, the link that the user clicks on will also be "rewritten" in decorated form in accordance with the invention. Also, if a connection is made to an un-secure site, and a user subsequently clicks a secure link within that web site, the proxy server 110 automatically re-decorates the URL, to provide the secure connection. Therefore, a user only has to type the decorated URL once each time a new Web site is accessed.

As indicated above, embodiments of the present invention contemplate that a decorated URL contains the proxy server 110 host name and port number, and the web address of the site that is to be accessed. For example, a decorated URL for the Aether Software Web (www.aethersystems.com) site may look like:

http://yourscoutweb_domain_name:port_number/?url=
http://www.aethersystems.com.

Secure requests made either to and/or from the proxy server 110 can be done by using a decorated URL. If a decorated URL is being used, there are three options. First, a completely secure connection can be made from the mobile device 108, and optionally forwarded by the gateway 109 (if one is used), to proxy server 110, and from the proxy server 110 to the origin web server 102 (i.e., the user makes a secure request to the proxy server 110 and a secure request to the web page 104. The origin server 102 then encrypts the user request and the web page 104 that is returned to the mobile device.). This type of connection provides end-to-end security and is useful, for example, for e-commerce sites or for secure Web-based applications. This type of decorated URL may look as follows:

https://yourscoutweb_domain_name:port_number/?url=
https://www.aethersystems.com.

Second, a secure connection can be made between the mobile device 108, including the gateway 109 (if one is used), and the proxy server 110. A business or content provider, for example, that uses the proxy server at the bridge of a firewall may want users to make a secure connection to the proxy server 110. This is a partially secure connection. This embodiment contemplates a secure connection between, for example, at least a gateway to which the mobile device 108 interfaces, and the proxy server 110. This type of decorated URL may look, for example, as follows:

https://yourscoutweb_domain_name:port_number/?url=
http://www.aethersystems.com.

Finally, a secure connection can be made between the proxy server 110 and the origin web server 102. For example, a wireless ISP may want to have users make a regular un-secure request in order to access the proxy server 110, and then make a secure connection between the proxy server 110 and the origin server 102. In this case, the decorated URL may look, for example, as follows:

http://yourscoutweb_domain_name:port_number/?url=
https://www.aethersystems.com.

It will be understood that, depending on the mobile device, the menus that a user will need to access on the mobile device to set up the decorated URL will vary. For example, on a PALM V device, the HandWeb icon in the applications launcher can be tapped to display the last page accessed. Then, the menu button can be tapped to display the Options menu, in which the Open Location menu item may be tapped. The decorated URL may then be typed in the URL field, and the web site corresponding to the URL is then accessed.

Figure 2:
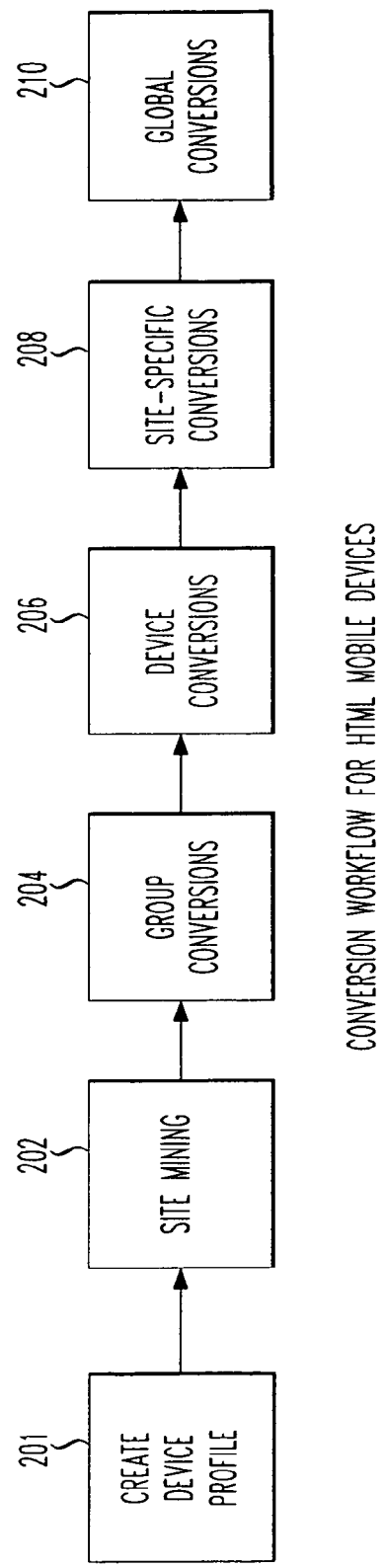
FIG. 2 is a schematically simplified flow diagram of the conversion workflow for HTML mobile devices.

FIG. 2 is a simplified flow diagram of a conversion work-flow for HTML-based mobile devices, as contemplated by the present invention. In step 201, a device profile is created for each type mobile device 108 in accordance with the HTTP. It is envisioned that each mobile device 108 is registered with the proxy server 110 to indicate which conversions for the device 108 are desired. Then, when conversion engine 110 receives a request 106, it compares the headers in the request 106 with the headers in an extraction and conversion file associated with the requesting mobile device 108 to determine which conversions to perform.

Figure 3:
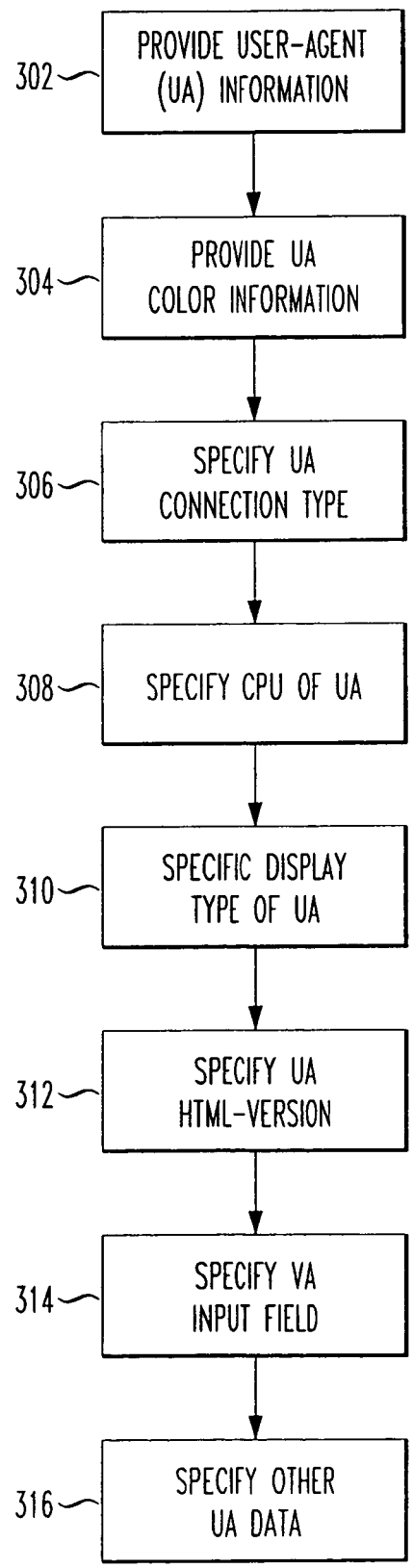
FIG. 3 is a flow diagram illustrating a process of creating a device profile.

One method of performing step 201 as contemplated by embodiments of the present invention is shown in FIG. 3. In step 302, user-agent (UA) information (i.e., mobile device 108 information) is provided to the proxy server 110 that uniquely identifies a type of mobile device 108 (e.g., by make and/or model) and the Web browser used on that device. The user-agent information is stored in either the device profile information on the proxy server 110 or, for example, in a global file that stores such information for all devices 108.

In step 304, in accordance with the HTTP (and HTTPS) specification, UA-color information is provided via a header that specifies, for example, the screen color of the mobile device 108. In various embodiments if a mobile device 108 sends this header, the conversion engine 110 performs color reduction automatically taking into consideration, for example, the screen color of the mobile device 108. If the mobile device does not send the UA-color header, a color reduction conversion for the mobile device 108 can be configured. If the mobile device 108 does send a UA-color header, the value sent in the header can optionally be over-ridden to improve device performance by, for example, reducing colors to a level lower than the device's maximum capability.

The UA-connection type (e.g., HTTP or HTTPS) between the mobile device 108 and the proxy server 110, and/or the proxy server 110 and the origin web server 102 is specified in step 306. The UA-connection is used to specify the type of connection that the mobile device 108 connects to. In step 308, the UA-CPU is specified. This information is used to specify the CPU (e.g., the manufacturer, model, and/or clock speed) of the mobile device 108. In step 310, the UA display field is used to specify the display type of the user u agent. In step 312, the UA-HTML field is used to specify the version of HTML of the mobile device 108. In step 314, The UA-input field 414 is used to specify the types of input fields (e.g., password field, text box, image, file, etc.) of the mobile device 108 screen display. In step 316, the UA-language field is used to specify the language of the mobile device 108 (e.g., English, Spanish, etc.). In step 316, other fields, such as UA-operating system can be used to specify, e.g., the operating system of the mobile device 108, as well as other items of information. It will be recognized that not all of the above-identified steps will be applicable to every type of mobile device 108.

Figure 4:
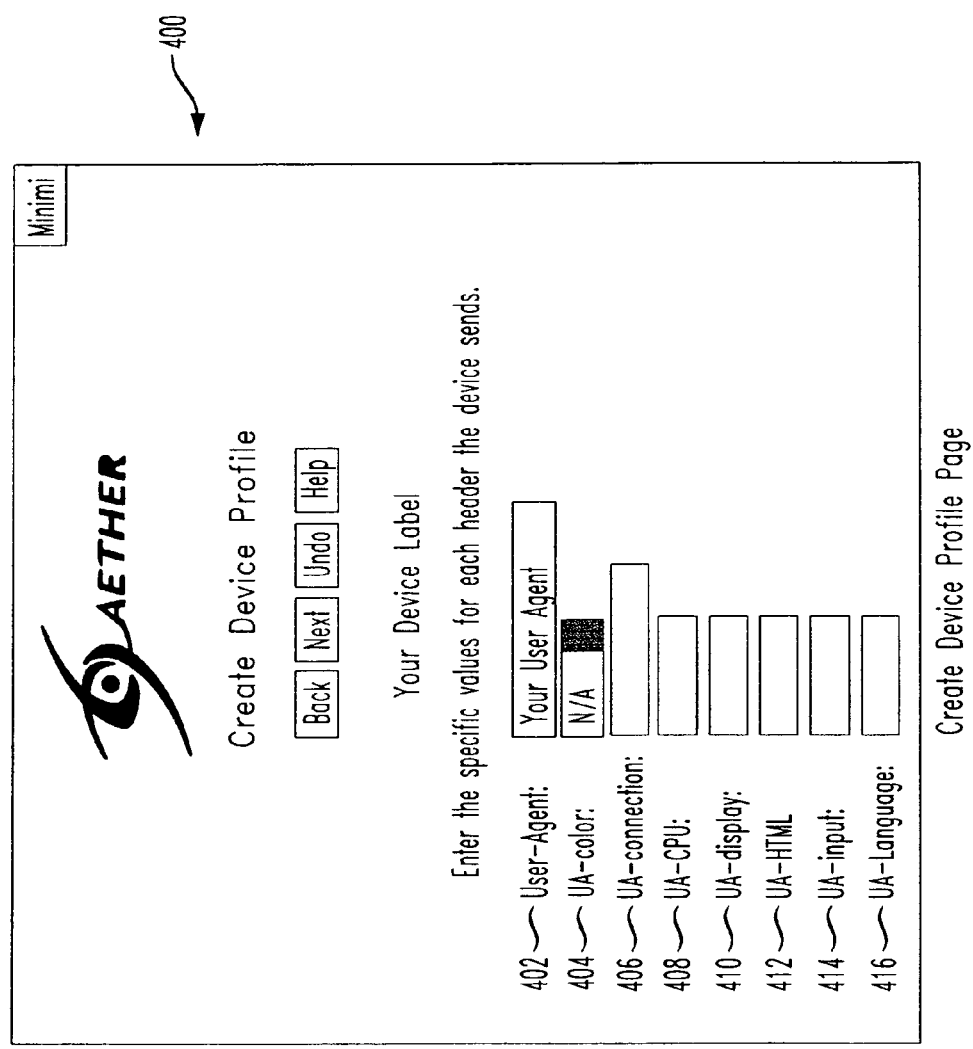
FIG. 4 is a representative screen display wherein a device profile can be created.

FIG. 4 shows a representative screen display that may be used to enter the data of FIG. 3. The UA field 402, UA-color field 404 field, UA-connection field 406, UA-CPU field 408, UA-display field 410, UA-HTML field 412, UA-input field 414, and UA-language field 416 are shown. As indicated in step 316, other input fields, such as, for example, the UA operating system, may also be provided.

Mobile device 108 profiles, as previously noted, can comprise a series of device headers based on fields 402, 402, 406, 408, 410, 414, 416 (e.g., HTTP request headers). When a user requests a web page 104 using a mobile device 108, the mobile device 108 sends associated HTTP request headers, which uniquely identify the mobile device 108 to the proxy server 110. A mobile device 108 is generally defined by both the hardware and browser. The device headers thus serve to identify the mobile device 108 to the proxy server 110.

Figure 5:
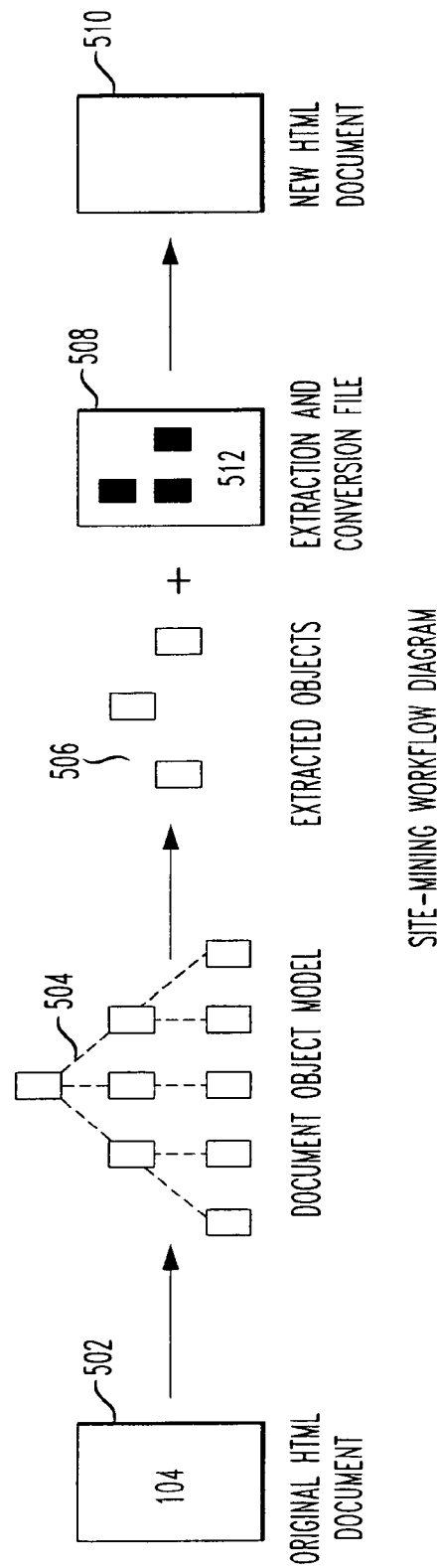
FIG. 5 is a site-mining workflow diagram.

In step 202, site-mining is performed, where web page content is extracted from a web page 104. The site-mining 202 process as contemplated by embodiments of the present invention is shown in FIG. 5. In step 502, the desired web page 104 is retrieved by the proxy server 110. The retrieved document is envisioned to be a HTML-based or similar document (e.g., a WML document). In step 504, a Document Object Model (DOM) (shown at 600 in FIG. 6) corresponding to the retrieved web page 104 is created. The DOM 600, as proposed by the World Wide Web Consortium (W3C), is a standard internal representation of the document structure and attempts to make it easier for programmers to access components and delete, add or edit their content, attributes and style. In essence, the DOM 600 makes it possible for programmers to write applications which work properly on all browsers and servers, and on all platforms. While programmers may need to use different programming languages, they do not need to change their programming model. The W3C's DOM 600 thus offers programmers a platform- and language-neutral program interface which will enable programming across platforms with languages such as, for example, Java and ECMAScript.

Figure 6:
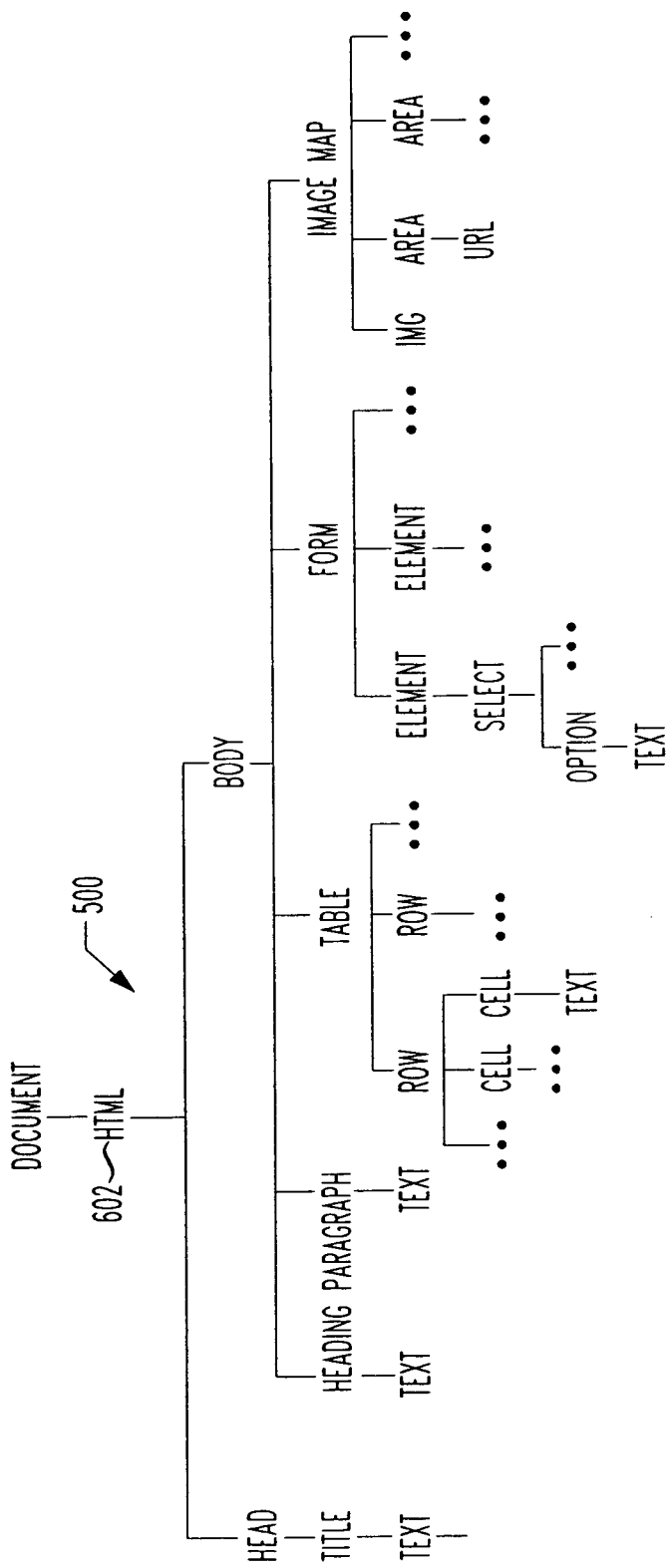
FIG. 6 is a diagram of the Document Object Model (DOM)

Referring to FIG. 6, the DOM 600 shown therein is an exemplary representation of an HTML document in which all elements are treated as objects. The DOM is a platform-neutral and language neutral interface allowing dynamic access and updating of content, structure, and style of documents. A single DOM object can represent an element (e.g., the text in an element or an attribute value), the entire document (e.g., web page 104) or a collection of objects. The DOM 600 object hierarchy is a series of nested objects, where each object contains either data or additional objects. The topmost object is the HTML document 602 (e.g., web page 104) itself. For further reference, see the W3C's DOM Level 1 Specification, dated Oct. 1, 1998, which is incorporated herein by reference.

In step 506, objects are extracted from the web page 104 in accordance with the DOM 600. For example, the name of the tag the content resides in must be determined (e.g., table), as well as the tag number (e.g., is it the first table? Second?). Also, whether the content is in a sub-tag or child of a parent tag should be determined. If so, what number is it? (e.g., if it is a table row that is desired, then what number is it?)

In step 508, the site-mining expressions, contained in an extraction and conversion file 512, are performed on the extracted object(s) of step 506. Embodiments of the present invention contemplate that one or more methods having the functionality of the methods provided in, for example, the Exemplary Site Mining Methods section will be used to extract the desired content. In accordance with the present invention, one or more of the conversion methods shown in the Site-Mining Expressions Examples section is used to convert/reformat one or more of the extracted objects to facilitate display on one or more mobile devices 108. Then, in step 510, after applying the operations contained in the extraction and conversion file 512 to the web page 104, the transformed web page 122 is provided and transmitted to one or more mobile devices 108. (However, prior to the transmission to one or more mobile devices, other types of conversions can also be performed, as indicated in FIG. 2).

The following three examples of site-mining expressions are provided. The expressions utilize methods defined in, for example, the Exemplary Site-Mining Methods section. As shown by the following examples, a site-mining expression specifies a path to an object (HTML element) from the DOM (e.g., web page 104) using methods defined in the site-mining expression language as shown in the Exemplary Site-Mining Methods section. Each of the methods contained in the Exemplary Site-Mining Methods section performs an action on a collection of objects in the object hierarchy. Each method returns a list of one or more objects. It should be understood the following examples are illustrative only, and that the potential number of HTML source code and expression combinations are virtually infinite.

Site-Mining Expression Examples

| Original HTML code |
|---|
| <HTML> |
| <HEAD> <TITLE> Title of the Page </TITLE> </HEAD> |
| <BODY> |
|   <TABLE WIDTH="600" ID="ScoutWeb"> |
|     <TR><TD> table 1, row 1 </TD></TR> |
|     <TR><TD> table 1, row 2 </TD></TR> |
|     <TR><TD> |
|       <TABLE WIDTH="300"> |
|         <TR><TD ID="ScoutWeb"> table 2, row 1 </TD></TR> |
|         <TR><TD> table 2, row 2 </TD></TR> |
|       </TABLE> |
|     </TD></TR> |
|   </TABLE> |
| </BODY> |
| </HTML> |

Site mining expression #1:
titleEx1=document.all.tags("TITLE").item(0).html; produces:
<TITLE> Title of the Page </TITLE>
Site mining expression #2:
titleEx2=document.all.tags("TITLE").item(0).text; produces
Title of the Page
Site mining expression #3:
tableEx1=document.all.tags("TABLE").item(1).html; produces

| <TABLE WIDTH="600" ID="ScoutWeb"> |
|---|
|   <TR><TD> table 1, row 1 </TD></TR> |
|   <TR><TD> table 1, row 2 </TD></TR> |
|   <TR><TD> |
|     <TABLE WIDTH="300"> |
|       <TR><TD ID="ScoutWeb"> table 2, row 1 </TD></TR> |
|       <TR><TD> table 2, row 2 </TD></TR> |
|     </TABLE> |
|   </TD></TR> |
| </TABLE> |

In step 204, group conversions can be optionally performed. Group conversions are conversion rules that are applied to a group of similar mobile devices. For example, a group conversion can be applied to all Palm operating system devices. After such group conversion rules have been created, these rules can be applied to every new version of a Palm operating system device that is added to the system. Using group conversions saves time, for example, because it saves from having to keep re-entering the same conversion rule(s) for all versions of a device (e.g., Palm 3x, Palm VII, etc.). Thus, e.g., one or more predefined conversions can be applied to any device(s) using a given operating system (e.g., Palm OS).

Figure 7:
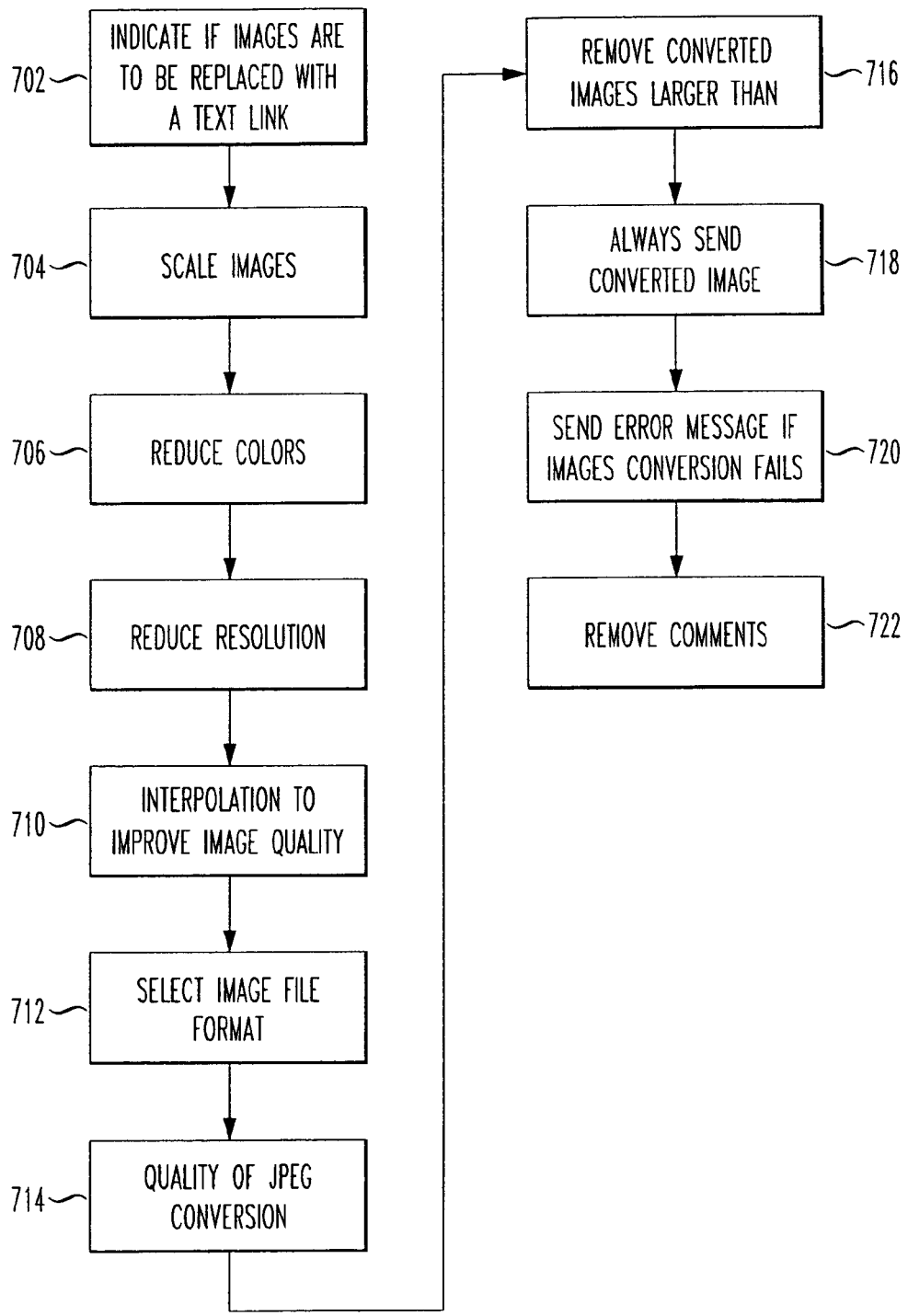
FIG. 7 is a flow diagram illustrating a process of creating conversions for a group of mobile devices.

A method (as contemplated by embodiments of the present invention) of performing step 204 is shown in FIG. 7. In step 702, an individual can define whether images are to be replaced with, for example, a text link field 602. In step 704, an individual can optionally scale images and image maps. In general, the user can type the percentage as an integer between, for example, 1 and 100. In step 706, an individual can reduce the colors of the graphics in the web page 104 contents being converted. For example, the mono number or color number (#=1, 2, 4, 8, 16, or 24, etc.) can be provided as input.

In step 708, the resolution of the graphics in the web page 104 being converted can be reduced. In general, the percentage can be entered as an integer between 1 and 100. In step 710, interpolation can optionally be used to improve image quality. This feature allows tuning of the quality of the scaled images. For example, an individual can select "yes" if he or she is scaling images and wants to improve quality. In step 712, the file format of images can be selected (e.g., .gif or JPEG).

In step 714, the quality of JPEG conversion is specified. Here, an individual can enter, for example, an integer between 0 and 100, where 100 indicates the highest quality. In step 716, images larger than a prespecified size can optionally be removed (i.e., from being sent to a mobile device 108). An individual can, for example, enter the number of the maximum file size to be sent to a mobile device 108 in kilobytes.

In step 718, an "always send converted image" feature can optionally H be invoked. This will send a converted image even, for example, if the file size is larger than that specified in step 716. In step 720, the conversion engine 110 can be directed to send an error message to the corresponding mobile device 108 if an image conversion fails. In step 722, the conversion engine can be directed to remove comments (e.g., either in <COMMENT> tags or in <!--comment→format) from the content. An individual can select "Yes", for example, to remove all comments, or "No", for example, to leave them in the content.

It should also be understood that additional settings regarding group conversions can optionally be provided in accordance with the present invention that allow users to, for example, translate tables, remove a tag, remove tag and content, replace tag, remove an attribute from a tag, add an attribute to a tag, set an attribute value, scale an attribute value, and/or set an attribute minimum and/or maximum. Illustrative examples of these features are provided in the Site-Mining Expression Examples section.

Figure 8:
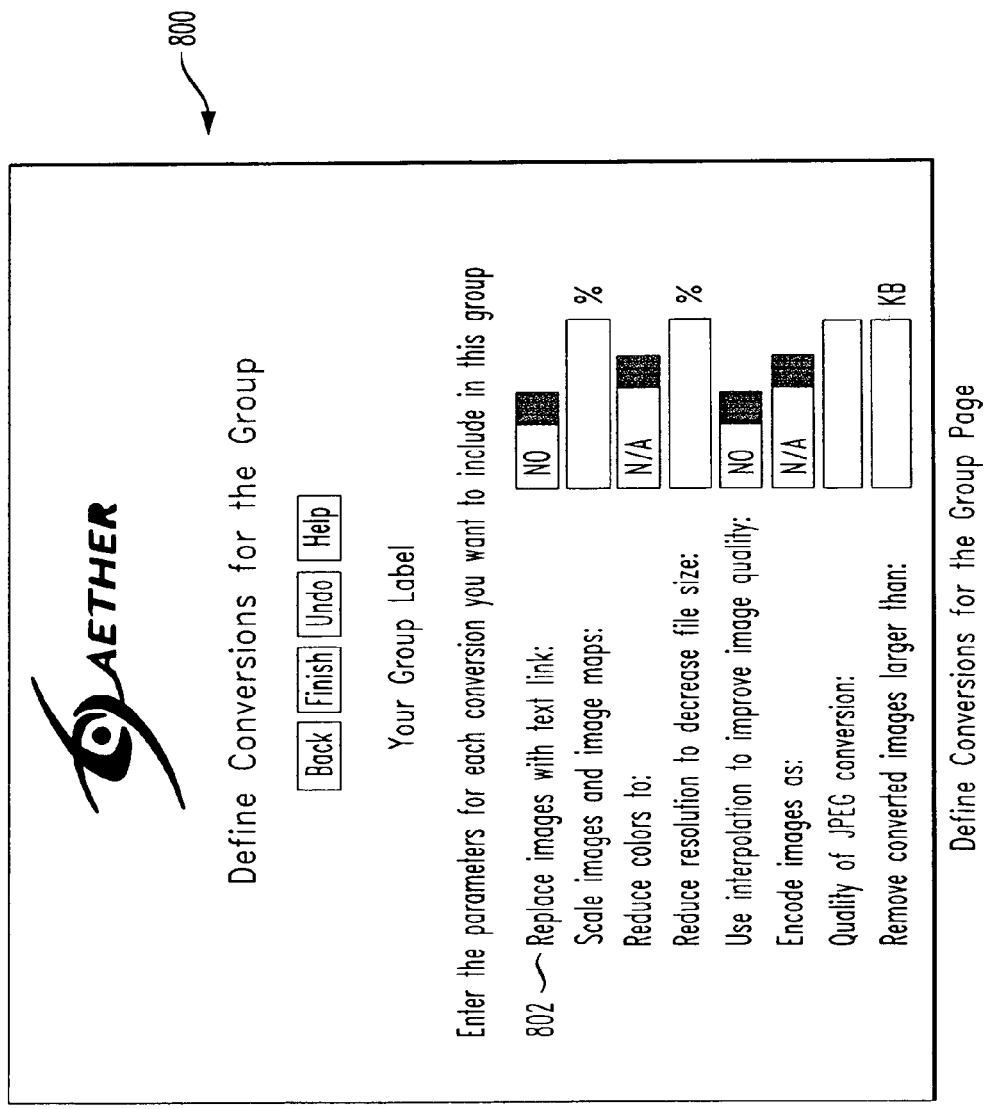
FIG. 8 is an exemplary screen display wherein conversions are defined for a group of mobile devices.

A representative screen display corresponding to the method shown in FIG. 7 is provided in FIG. 8. As shown, field 802 enables images to be replaced with text links. Other fields are also shown corresponding to the steps shown in and discussed with regard to FIG. 7.

Figure 9:
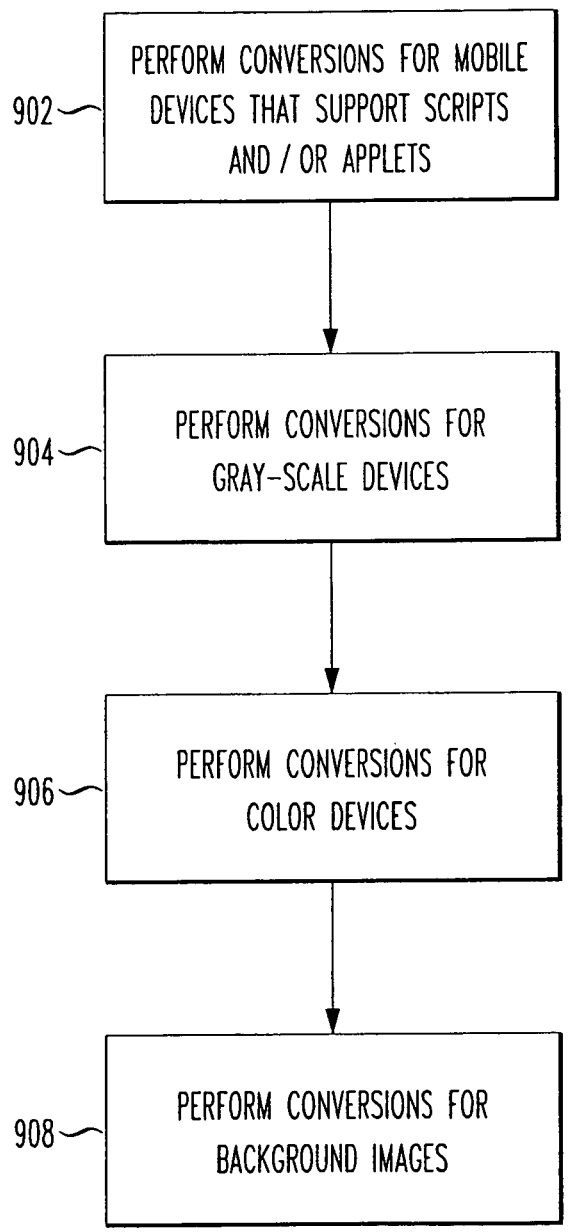
FIG. 9 is a flow diagram illustrating a process of creating conversions for particular mobile devices.

Returning to FIG. 2, in step 206, device conversions can be optionally performed. Device conversions are rules that change or format Web content according to, for example, the specific version of a device and its web browser. As previously discussed with regard to step 204, a group conversion can be set up that is applicable to, say, Palm operating system devices. Using device conversions, it is possible to, for example, specify more specific formatting rules that apply to individual device types within, for example, the Palm OS family (e.g., Palm III, Palm X, Palm VII, etc. devices). As shown in FIG. 9, the method of performing a number of recommended conversions for specific mobile devices 108 is provided. In step 902, conversions are performed for mobile devices 108 that, for example, support Java scripts or applets. In step 904, conversions for gray-scale devices are made. Potential conversions include, for example, removing the <U> tag, encoding images as GIF, and converting any color header images to gray scale.

In step 906, conversions can be created for color devices. Such conversions for color devices will depend, for example, on goals. If the goal is to optimize the performance of the server 102, then either reducing images to gray scale by specifying a color depth (e.g., mono8 or lower), or reducing the resolution to decrease file size (e.g., enter 90 percent or lower) is generally recommended. In step 908, the effect of removing background images can be considered. Many web pages 104 use light text and a dark background. If the background images or color are removed, the light text becomes unreadable. Therefore, a conversion to remove the color attribute of the <FONT> tag can be provided. However, in one embodiment, it is not recommended that the width and height attributes of the <IMG> tag be removed. These attributes enable the mobile device 108 browser to format the display faster. Finally, it should also be understood that image conversions will slow down the performance of the proxy server 110. If the mobile device 108 web browser converts images fairly well (e.g., work as a clipper), it may be preferable to let the browser handle image conversions. It should be understood that in one embodiment a device specific conversion will override, for example, corresponding parameters and/or values specified in group conversions.

Of course, it should be understood that various other conversion types in addition to, and/or in lieu of, those mentioned in FIG. 9 are also contemplated by embodiments of the present invention.

Returning to FIG. 2, in step 208, site-specific conversions can be optionally performed. Site-specific conversions are rules that change or format web page 104 content for a specific web page 104, or for those web pages within a given directory, or site (or portion thereof). The number of possible conversions is virtually infinite, and may include any of the appropriate combinations of methods and transforms.

Figure 10:
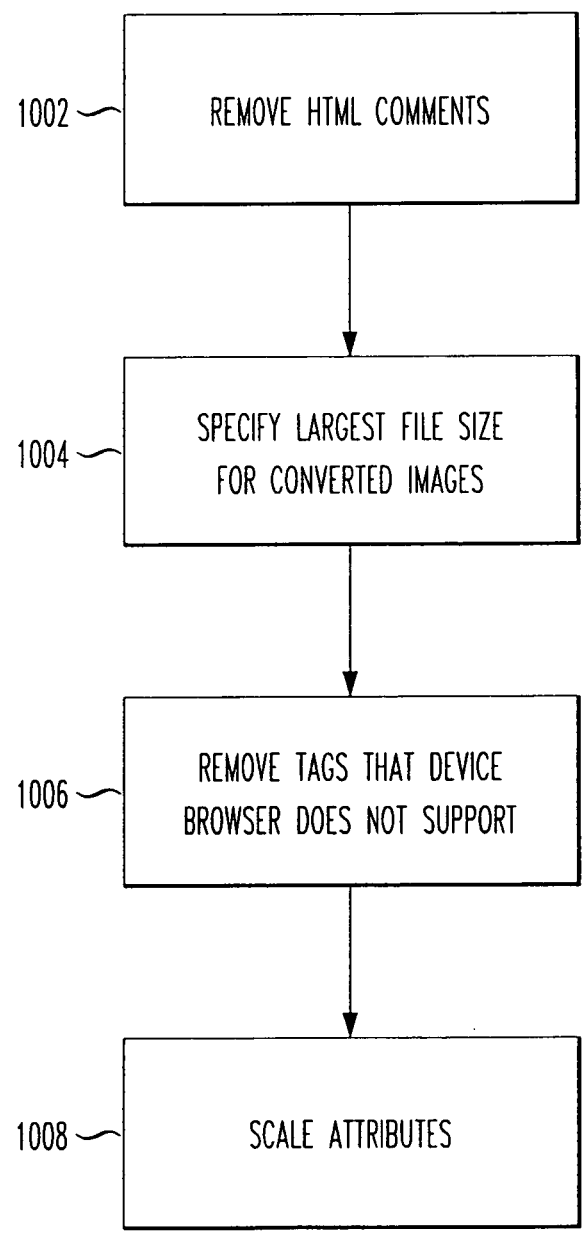
FIG. 10 is a flow diagram illustrating a process of creating conversions for all web sites.

In step 210 of FIG. 2, global conversions can be optionally performed. Global conversions are rules that change or format web content on all web pages 104 for either one type of device or all devices. One possible method of performing global conversions is indicated in FIG. 10. In this exemplary embodiment, the conversion does not have an effect on the content the user sees, but decreases the amount of data sent, thus providing a faster download experience for any user. It should be understood that FIG. 10 is illustrative only, and that the invention enables numerous other operations to be performed on web pages depending on, for example, the needs and/or types of mobile devices 108 that a particular organization may utilize.

Referring now to FIG. 10, in step 1002 HTML comments are first removed. In step 1004, the largest file size for converted images is specified. That is, the largest amount of image data that is to be transmitted to a mobile device 108 is specified. The amount can be based at least on the type of Internet connection the mobile device 108 uses. For example, if the mobile device 108 has a slow connection, the conversion engine 118 can be configured to omit images over a specified size. If the mobile device 108 has a faster connection, larger file size value can be specified. In step 1006, HTML tags that the browser does not support are removed. A list of unsupported HTML tags can be obtained from, for example, the manufacturer of the browser on the mobile device 108. The conversion engine 118 can then be configured to remove and/or replace them. In general, it is typically more efficient, and therefore preferable, for the conversion engine 118 to remove such tags rather than sending information to the mobile device 108 which cannot be used. Finally, in step 1008, attributes should be scaled. In many instances, the size of an item is specified in HTML as a percentage, to which the browser automatically scales the item. For cases where the size of an item is specified in HTML as pixels, however, the size can be reduced to ensure that it fits in the display area for the device.

Exemplary Site-Mining Methods

This section contains a list of all of the site-mining methods. Each method reference contains the following information:
- Method name
- Description: A brief description of the method including a list of all objects the method can extract from an HTML page.
- Preceded by: For methods that have to come after a particular method.
- Followed by: A list of other methods that you can use in the site-mining expression following the object specified by this method. Because a site-mining expression drills down to a specific object in the DOM hierarchy, these methods must be provided in a specific order.
- Example: Excerpts from an example site-mining expression used to extract content from a web site.

all
Description: This method returns all elements contained in the proceeding object.
Followed by: tags, item, grep, attributeMatch, text, getAttribute, html
Example: document.all.html;
Note: Allsite-mining expressions start with document.all.

areas(n) or areas
Description: Returns one or all areas defined in an image map
Preceded by: Map
Followed by: all, grep, attributeMatch, text, getAttribute, html
Example: document.all.tags("MAP").item(0).areas(2).getAttribute("HREF");
 Results: This returns the HREF attribute from the 3rd area of the first image map in the document.

aTtributeMatch
Returns: Returns the object(s). Elements that contain these attribute name/value pairs.
Followed by: all, grep, attributeMatch, text, getAttribute, html
Example: document.all.tags("TABLE").attributeMatch(WIDTH="300").html;
 Results: This returns the html of the table(s) that have a WIDTH attribute set to 300.

cells(n) or cells
Returns: One or all cells in a table row.
Preceded by: Table row. (TR)
Followed by: all, grep, attributeMatch, text, getAttribute, html
Example: document.all.tags("TABLE").item(0).tags("TR").item(4).cells.html;
 Results: This will give you the HTML for all of the cells (TD tags) in the 5th row of the 1st table in the HTML document.

children(n) or children
Returns: This returns children(n) or children. One or all children of form or list.
Preceded by: This element will return one or all children
Followed by: all, grep, attributeMatch, text, getAttribute, html
Example: document.all.tags("FORM").item(0).children.html;
 Results: This returns the html of all children objects of the 1st form. document.all.tags("UL").item(3).children(2).text;
 Results: Returns the text of the 3rd list item in the 4th unordered list in the document.

document
Returns: An HTML document.
Preceded by:
Followed by: all
Example: document.all.html elements(n) or elements
Returns: One or all elements in a form.
Preceded by: FORM
Followed by: all, grep, attributeMatch, text, getAttribute, html getAttribute
Description: The value of the specified attribute from the proceeding tag.
Preceded by: Any tag that has the specified attribute.
Followed by: Nothing. You can not have another method follow this method.
Example: document.all.tags("FRAME").attributeMatch(NAME="main").
 Returns: The SRC attribute from the FRAME tag that is named "main".

grep
Returned: This method returns elements containing text that matches the regular expression.
Preceded by: Any method returning an object that contains text to match the regular expression.
Followed by: all, grep, attributeMatch, text, getAttribute, html
Example: document.all.tags("TABLE").grep("Table of Contents").html;
 Results: Returns all tables that contain the text "Table of Contents" anywhere inside the <TABLE> tags.

HTML
Description: This method returns the HTML tags and the text in an element.
Followed by: Nothing. You can not have another method follow this method.
Example: document.all.html;
 Results: All of the HTML in the document (the original HTML page).

item(n) or item("name")
Description: The nth+1 element in a collection of elements, or elements with name specified as an ID or name attribute value.
Followed by: all, grep, attributeMatch, areas, elements, options, rows, children, text, getAttribute, html
Example: document.all.item("sw-Main").html;
 Results: Returns the HTML of all elements that contain a NAME-"sw-Main" attribute or an ID-"SW-Main" attribute.

options(n) or options
Description: Returns one or all options in a form's select list.
Preceded by: Select tag in a form.
Followed by: all, grep, attributeMatch, text, getAttribute, html
Example: document.all.tags("FORM").item(0).tags("SELECT").options.html;.item(0)
 Results: Returns the HTML for the options in the 1st Select element in the 1st form of the HTML document.

rows
Description: Returns one or all rows in a table.
Preceded by: Table.
Followed by: all, cells, grep, attributeMatch, text, getAttribute, html Example: document.all.tags("TABLE").item(0).rows(2).cells(0).text;

Results: Returns the text in the 1st cell of the 3rd row in the 1st table of the HTML document.

tags

Description: Returns all "tag" tags.

Followed by: all, item, grep, attributeMatch, areas, elements, options, rows, children, text, getAttribute, html Example: document.all.tags("P").html;

Results: Returns the HTML for all Paragraph <P> tags in the HTML document.

text

Description: This element gets the text contained in a list of objects

Followed: Nothing. You cannot have another method by follow this method

Example: document.all.tags("TITLE").item(0).text

All Site-Mining Expressions

The following table summarizes all of the site-mining methods that can be used to build site-mining expressions.

| Method | Object Returned by This Method |
|---|---|
| all | All elements contained in an object |
| areas(n) or areas | One or all areas defined in an image map |
| attributeMatch (name = value[, name = value]) | Elements that contain these attribute name/value pairs |
| cells(n) or cells | One or all cells in a table row |
| children(n) or children | One or all children of an object |
| document | HTML document |
| elements(n) or elements | One or all elements in a form |
| getAttribute("attribute_id") | Value of the attribute |
| grep("regular expression") | Elements containing text that matches the regular expression |
| html | HTML representation of an element |
| item(n)or item ("name") | The nth + 1 element in a collection of elements, or elements with name specified as an ID or name attribute value |
| options(n) or options | One or more. |

Methods Used to Get Objects

| Object Needed | Method |
|---|---|
| An HTML document | document |
| All elements contained in an object | all |
| nth + 1 element in a list of elements | item(n) |
| Elements with name specified as an ID or name attribute value | item("name") |
| Elements with this HTML tag | tags("tag") |
| Elements with this attribute name and value | attributeMatch(name = value[, name = value]) |
| Elements containing text that matches this regular_expression | grep("regular_expression") |

SW-Transforms

Transform name
Description: a brief description of the method
Syntax: how the transform would appear in your template (either a site-specific template or the globals template)
Example: an example of the sw-transforms
AddHeader
Description: This rule tells the conversion engine to add the meta tag information to the header of a page.
Syntax: sw-transform "Nokia-WAP-Toolkit/1.2" AddHeader:META TAG NAME:META TAG VALUE
Example: To add the header, <META name="PalmComputingPlatform" content="true"> to all Web content, you would enter the following text in the globals.txt file:
sw-transform "Mozilla/2.0 (compatible; Elaine/1.0)" AddHeader:PalmComputingPlatform:True.
AddAttributteToTag
Description: This rule tells the conversion engine to add a specific attribute and attribute value to a specific tag. The rule includes the tag name, the attribute and the attribute value, each separated by a colon.
Syntax: sw-transform "Mozilla/2.0 (compatible; Elaine/1.0)" AddAttributeToTag:TAG NAME:ATTRIBUTE NAME "ATTRIBUTE VALUE"
Example: To center heading 2, you would enter:
sw-transform "Mozilla/2.0 (compatible;Elaine/1.0)" AddAttributeToTag H2:ALIGN:"CENTER".
IgnoreGlobalTransformations
Description: This rule tells the conversion engine to ignore the global conversions.
Syntax: sw-transform "Nokia-WAP-Toolkit/1.2" IgnoreGlobalTransformations
Example: For example, say you applied the sw-transform RemoveAttributeFromTag rule to your Global Rules File so that you could remove all SRC attributes from the IMG tag from all Web sites. Then, you decide you need to display the images for a particular site. You could use the sw-transform IgnoreGlobalTransformations rule in the template for the site tooverridethe global rule contained in the globals.txt file. sw-transform "Mozilla/2.0 (compatible;Elaine/1.0)" IgnoreGlobalTransformations
InsertTextFromFile
Description: This rule tells the conversion engine to insert text from the specified file into the template.
Syntax: sw-transform "Mozilla/2.0 (compatible;Elaine/1.0)" InsertTextFromFile:path to file and filename.
Example #1: sw-transform "Mozilla/3.0 (compatible; HandHTTP 1.1" InsertTextFromFile:c:\ScoutWeb\CommonTransforms
Note: This can be used to create "functions of commonly used sw-transforms by putting common sw-transforms in a file and then referencing that file in a site-specific or globals template using the InsertTextFromFile command.
Example #2: For this HTML code: <FRAMESET><FRAME SRC=http://main.com" NAME="main"><FRAME SRC=http://nav.com" NAME="nav"><FRAME SRC=http://banner.com" NAME="banner"></FRAMESET>
If some of the content is desired, the site mining expression would look like this: main=document.all.tags("FRAME"). attributeMatch(NAME="main") .getAttribute("SRC").text;

The sw-transform would look like this: sw-transform "Mozilla/3.0 (compatible; HandHTTP 1.1" InsertTextFromFile:&% main; or If it is desired that the call to http://main.com to go through the conversion engine, then the following code may be provided:

sw-transform "Mozilla/3.0 (compatible; HandHTTP 1.1" InsertTextFromFile:http://scoutweb_server:81/&% main;

RemoveAttributeFromAllTags

Description: This rule tells the conversion engine to remove a specific attribute (such as the width) from all tags.

Syntax: sw-transform "Mozilla/3.0 (compatible; HandHTTP 1.1" RemoveAttributeFromAllTags:ATTRIBUTE NAME Example: To remove the WIDTH from all tags, you would enter:

sw-transform "Mozilla/3.0 (compatible; HandHTTP 1.1" RemoveAttributeFromAllTags:WIDTH RemoveAttributeFromTag Description: This rule tells the conversion engine to remove a specific attribute from a specific tag.

Syntax: sw-transform "Mozilla/3.0 (compatible; HandHTTP 1.1" RemoveAttributeFromTag:TAG NAME:ATTRIBUTE NAME Example: To remove the width from a table, the following may be entered:

sw-transform "Mozilla/3.0 (compatible; HandHTTP 1.1" RemoveAttributeFromTag:TABLE:WIDTH To remove the Background attribute from the Body tag, the following may be entered: sw-transform "Mozilla/3.0 (compatible; HandHTTP 1.1" RemoveAttributeFromTag:BODY:BACKGROUND.

RemoveComments

Description: This rule tells the conversion engine to remove the comments tag from a Web site or specific Web content. (Comments include both general information on the page (such as: <! . . . text . . . >) and information actually within the <COMMENT> tag.)

Syntax: sw-transform "Mozilla/3.0 (compatible; HandHTTP 1.1" RemoveComments

Example: To remove comments, the following may be entered:

sw-transform "Mozilla/3.0 (compatible; HandHTTP 1.1" RemoveComments

RemoveTag

Description: This rule tells the conversion engine to remove a specific tag from a Web site or Web content, but leave the text or other HTML that lies within the tag.

Syntax: sw-transform "Mozilla/3.0 (compatible; HandHTTP 1.1" RemoveTag:TAG NAME

Example: To remove all images from a site the following may be entered:

sw-transform "Mozilla/3.0 (compatible; HandHTTP 1.1" RemoveTag:IMG

Note: This tag will always work, even if the Web content you are transforming generally contains poorly formatted HTML.

RemoveTagAndContent

Description: This rule tells the conversion engine to remove a specific tag, and the information that appears within the tags, from a Web site or Web content.

Syntax: sw-transform "Mozilla/3.0 (compatible; HandHTTP 1.1" RemoveTagAndContent:TAG Example: To remove the SCRIPT tag so that all of the client-side script on a specific Web site or page is removed, the following may be entered:

sw-transform "Mozilla/3.0 (compatible; HandHTTP 1.1" SCRIPT

Note: The RemoveTagandContent tag will not be completely effective if the Web content being transformed is poorly formatted (e.g., there is an open tag without a close tag).

The conversion engine will attempt to clean up the HTML, but may not be completely effective. Also, this tag does not have any meaning for empty tags.

ReplaceTag

Description: This rule tells the conversion engine to replace one tag with another.

Syntax: sw-transform "Mozilla/3.0 (compatible; HandHTTP 1.1" ReplaceTag:ORIGINAL TAG:NEW TAG Example: To remove all of the I tags and replace them with B, so that all of the text that appears italicized on a Web page appears bold on the mobile device screen, the following may be entered:

sw-transform "Mozilla/3.0 (compatible; HandHTTP 1.1" ReplaceTag:I:B.

SetAttributeValue

Description: This rule tells the conversion engine to set a specific value for a specific attribute of a specific tag. The attribute must already be present in the tag for this to work. This rule includes the tag name, attribute name, and value, all separated by colons.

Syntax: sw-transform "Nokia-WAP-Toolkit/1.2" SetAttributeValue:TAG:ATTRIBUTE:ATTRIBUTE VALUE Example: To give all tables a width of 150, the following may be entered:

sw-transform "Nokia-WAP-Toolkit/1.2" SetAttributeValue:TABLE:WIDTH:"150"

To make the font 2 pt, you would enter: sw-transform "Nokia-WAP-Toolkit/1.2" SetAttributeValue:FONT:SIZE:"2"

Stop

Description: This rule tells the conversion engine to stop processing all sw-transforms that follow in a template. This can be used at the end of a site-specific template file to keep the conversion engine from performing Global transforms.

Syntax: sw-transform "Nokia-WAP-Toolkit/1.2" STOP

Example: sw-transform "Nokia-WAP-Toolkit/1.2" RemoveComments sw-transform "Nokia-WAP-Toolkit/1.2" RemoveTag:B
sw-transform "Nokia-WAP-Toolkit/1.2" STOP
sw-transform "Nokia-WAP-Toolkit/1.2" RemoveTag:I
(Not performed because the stop is above this last transform.).

Substitute

Description: This rule tells the conversion engine to substitute one sequence of text for another sequence of text. You can substitute anything within or outside tags. This conversion works like a find and replace function. This transform is a regular expression.

You can make substitutions in one of four ways:
1. Add "i" to the end of the conversion if you want to substitute the first instance of the text regardless of case.
2. Add "g" to the end of the conversion if you want to do a case-sensitive global substitution.
3. Add "i" and "g" to the end of the tag if you want to perform a global, case insensitive substitution.

4. Don't add anything to the end of the tag if you want to perform case sensitive substitution of the first instance of the text.

Syntax: sw-transform "Nokia-WAP-Toolkit/1.2" Substitute:ORIGINAL TEXT:NEW TEXT:(i,g) parameters, or none of the above.

Note: ORIGINAL TEXT is a regular expression

Example: To remove text such as, "<Title>Aether Softwares' Daily Product Update</Title>" and replace it with Title>ScoutWeb Update<Title>, you would enter:

sw-transform "Nokia-WAP-Toolkit/1.2" Substitute:Aether Softwares' Daily Product Update:ScoutWeb Update:ig TranslateTables Description: This rule tells the conversion engine to remove the table formatting and make the table contents appear as straight text.

Syntax: sw-transform "Nokia-WAP-Toolkit/1.2" TranslateTables

Example: <TABLE BORDER=0 CELLPADDING="0" CELLSPACING="0">
done using rows
<tr>
<td><input type="text" value="one" size=7 maxlength=10 name="symbol"></td>
<td><input type="text" value="two" size=7 maxlength=10 name="symbol"></td>
<td><input type="text" value="three" size=7 maxlength=10 name="symbol"></td>
<td><input type="text" value="four" size=7 maxlength=10 name="symbol"></td>
<td><input type="text" value="five" size=7 maxlength=10 name="symbol"></td></tr>
<tr>
<td><input type="text" value="six" size=7 maxlength=10 name="symbol"></td>
<td><input type="text" value="seven" size=7 maxlength=10 name="symbol"></td>
<td><input type="text" value="eight" size=7 maxlength=10 name="symbol"></td>
<td><input type="text" value="nine" size=7 maxlength=10 name="symbol"></td>
<td><input type="text" value="ten" size=7 maxlength=10 name="symbol"></td>
</tr>
</TABLE>
<BR>
After TranslateTables
iinput type="text" value="one" size=7 maxlength=10 name="symbol">
<input type="text" value="two" size=7 maxlength=10 name="symbol">
<input type="text" value="three" size=7 maxlength=10 name="symbol">
<input type="text" value="four" size=7 maxlength=10 name="symbol">
<input type="text" value="five" size=7 maxlength=10 name="symbol">
<input type="text" value="six" size=7 maxlength=10 name="symbol">
 <input type="text" value="seven" size=7 max length=10 name="symbol">  
<input type="text" value="eight" size=7 maxlength=10 name="symbol">
<input type="text" value="nine" size=7 maxlength=10 name="symbol"> &ns
<input type="text" value="ten" size=7 maxlength=10 name="symbol">

Computer Implementation

Figure 11:
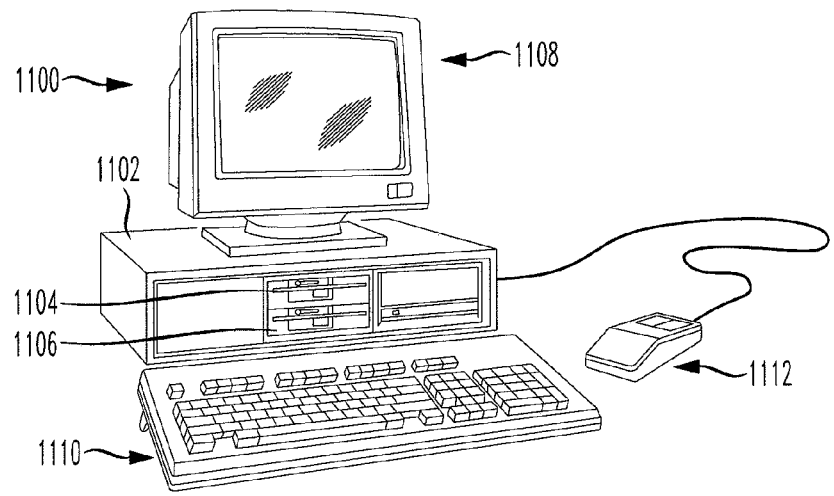
FIG. 11 illustrates one example of a central processing unit for implementing a computer process in accordance with a computer implemented stand-alone embodiment of the present invention.

The techniques of the present invention may be implemented on a computing unit such as that depicted in FIG. 11. In this regard, FIG. 11 is an illustration of a computer system which is also capable of implementing some or all of the computer processing in accordance with computer implemented embodiments of the present invention. The procedures described herein are presented in terms of program procedures executed on, for example, a computer or network of computers.

Viewed externally in FIG. 11, a computer system designated by reference numeral 1100 has a computer portion 1102 having disk drives 1104 and 1106. Disk drive indications 1104 and 1106 are merely symbolic of a number of disk drives which might be accommodated by the computer system. Typically, these would include a floppy disk drive 1104, a hard disk drive (not shown externally) and a CD ROM indicated by slot 1106. The number and type of drives vary, typically with different computer configurations. Disk drives 1104 and 1106 are in fact optional, and for space considerations, are easily omitted from the computer system used in conjunction with the production process/apparatus described herein.

The computer system also has an optional display 1108 upon which information, such as the screens illustrated in FIGS. 4 and/or 8 may be displayed. In some situations, a keyboard 1110 and a mouse 1112 are provided as input devices through which input may be provided, thus allowing input to interface with the central processing unit 1102. Then again, for enhanced portability, the keyboard 1110 is either a limited function keyboard or omitted in its entirety. In addition, mouse 1112 optionally is a touch pad control device, or a track ball device, or even omitted in its entirety as well, and similarly may be used as an input device. In addition, the computer system 1100 may also optionally include at least one infrared (or radio) transmitter and/or infrared (or radio) receiver for either transmitting and/or receiving infrared signals.

Although computer system 1100 is illustrated having a single processor, a single hard disk drive and a single local memory, the system 1100 is optionally suitably equipped with any multitude or combination of processors or storage devices. Computer system 1100 is, in point of fact, able to be replaced by, or combined with, any suitable processing system operative in accordance with the principles of the present invention, including hand-held, laptop/notebook, mini, main-frame and super computers, as well as processing system network combinations of the same.

Figure 12:
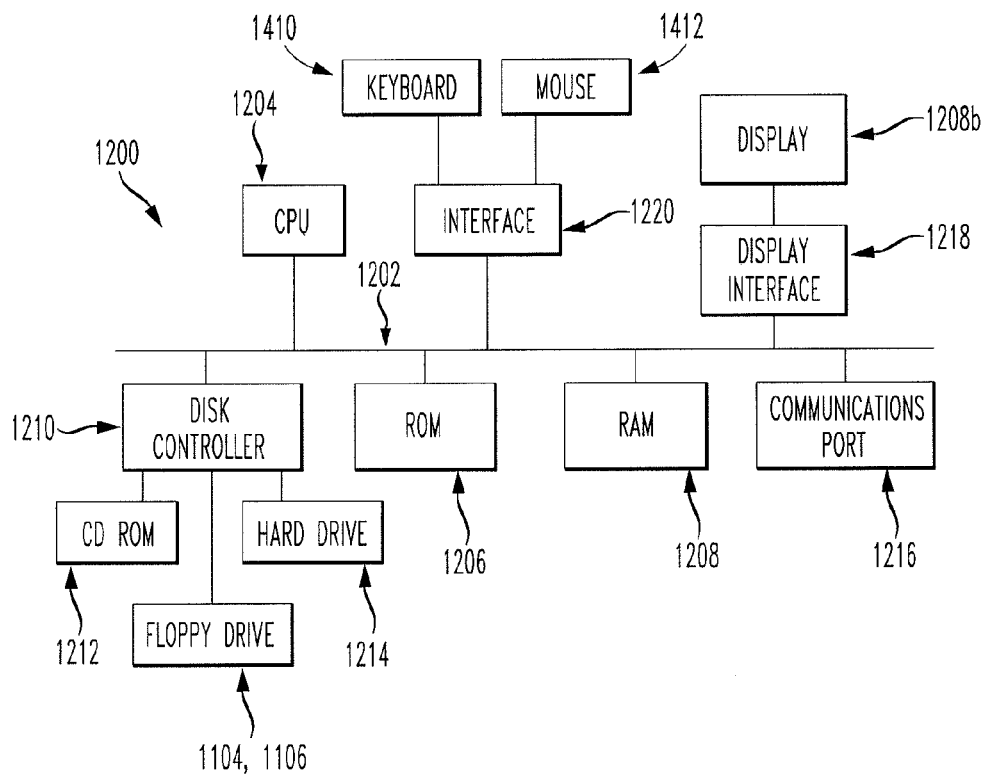
FIG. 12 illustrates one example of a block diagram of internal hardware of the central processing unit of FIG. 11.

FIG. 12 illustrates a block diagram of the internal hardware of the computer system 1100 of FIG. 11. A bus 1202 serves as the main information highway interconnecting the other components of the computer system 1100. CPU 1204 is the central processing unit of the system, performing calculations and logic operations required to execute a program. Read only memory (ROM) 1206 and random access memory (RAM) 1208 constitute the main memory of the computer 1102. Disk controller 1210 interfaces one or more disk drives to the system bus 1202. These disk drives are, for example, floppy disk drives such as 1104 or 1106, or CD ROM or DVD (digital video disks) drive such as 1212, or internal or external hard drives 1214. As indicated previously, these various disk drives and disk controllers are optional devices.

A display interface 1218 interfaces display 1208b and permits information from the bus 1202 to be displayed on the display 1108. Again as indicated, display 1108 is also an optional accessory. For example, display 1108 could be substituted or omitted. Communications with external devices, for example, the other components of the system described herein, occur utilizing communication port 1216. For example, optical fibers and/or electrical cables and/or conductors and/or optical communication (e.g., infrared, and the like) and/or wireless communication (e.g., radio frequency (RF), and the like) can be used as the transport medium between the external devices and communication port 1216. Peripheral interface 1220 interfaces the keyboard 1410 and the mouse 1412, permitting input data to be transmitted to the bus 1202.

In alternate embodiments, the above-identified CPU 1204, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

One of the implementations of the invention is as sets of instructions resident in the random access memory 1208 of one or more computer systems 1100 configured generally as described above. Until required by the computer system, the set of instructions may be stored in another computer readable memory, for example, in the hard disk drive 1214, or in a removable memory such as an optical disk for eventual use in the CD-ROM 1212 or in a floppy disk for eventual use in a floppy disk drive 1104, 1106. Further, the set of instructions (such as those written in the Java programming language) can be stored in the memory of another computer and transmitted in a transmission means such as a local area network or a wide area network such as the Internet 114 when desired by the user. One skilled in the art knows that storage or transmission of the computer program product changes the medium electrically, magnetically, or chemically so that the medium carries computer readable information.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

Having thus described our invention, what we claim as new and desire to secure by Letters Patent is as follows:

1. A method for extracting and reformatting web page content into a format readable on a mobile device, comprising:
receiving, at a proxy server, a user request from a physical mobile device for a web page having a first format, wherein said web page resides on a physical origin web server;
forwarding said user request from said proxy server to said physical origin web server;
receiving at said proxy server said web page from said physical origin web server;
site-mining, based on an extraction and conversion file configuring said proxy server, to replace a graphic element from said web page with a text element selected based on a single operating system used by a plurality of user devices including said physical mobile device; and
transmitting from said proxy server to said physical mobile device said site-mined text element.

2. The method according to claim 1, wherein said site-mining comprises:
identifying a portion of source code of said web page corresponding to said text element, wherein said source code is comprised of objects; and
wherein said object is site-mined by said site-mining.

3. The method according to claim 2, further comprising:
storing said site-mine replaced text element in a cache prior to said transmitting.

4. The method according to claim 1, wherein:
said transmitting is performed over a secure socket layer connection.

5. The method according to claim 1, further comprising:
providing a secure connection between said proxy server and said physical origin web server.

6. The method according to claim 5, wherein:
said secure connection is a secure socket layer connection.

7. The method according to claim 4, wherein:
said secure connection is between a gateway operatively communicable with said physical mobile device and said proxy server.

8. The method according to claim 1, wherein:
said replaced graphic element is site-mined based on a size of said graphic element.

* * * * *